United States Patent
Yu et al.

(10) Patent No.: US 11,968,551 B2
(45) Date of Patent: Apr. 23, 2024

(54) DYNAMIC RADIO FREQUENCY SWITCHING IN NEW RADIO FOR RADIO RESOURCE MANAGEMENT IN RADIO RESOURCE CONTROL CONNECTED STATE

(71) Applicant: Apple Inc., Cupertino, CA (US)

(72) Inventors: Zhibin Yu, Unterhaching (DE); Rui Huang, Beijing (CN); Yang Tang, San Jose, CA (US); Jie Cui, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 316 days.

(21) Appl. No.: 17/287,468

(22) PCT Filed: Oct. 22, 2019

(86) PCT No.: PCT/US2019/057425
§ 371 (c)(1),
(2) Date: Apr. 21, 2021

(87) PCT Pub. No.: WO2020/086571
PCT Pub. Date: Apr. 30, 2020

(65) Prior Publication Data
US 2021/0385676 A1    Dec. 9, 2021

Related U.S. Application Data

(60) Provisional application No. 62/750,464, filed on Oct. 25, 2018.

(51) Int. Cl.
*H04W 24/08* (2009.01)
*H04W 36/00* (2009.01)
*H04W 56/00* (2009.01)

(52) U.S. Cl.
CPC ....... *H04W 24/08* (2013.01); *H04W 36/0088* (2013.01); *H04W 56/001* (2013.01)

(58) Field of Classification Search
None
See application file for complete search history.

(56) References Cited

U.S. PATENT DOCUMENTS

| | | |
|---|---|---|
| 2018/0198585 A1 | 7/2018 | Lin et al. |
| 2018/0279145 A1 | 9/2018 | Jung et al. |

(Continued)

FOREIGN PATENT DOCUMENTS

| | | |
|---|---|---|
| CN | 101547008 A | 9/2009 |
| WO | 2018-169829 A1 | 9/2018 |

(Continued)

OTHER PUBLICATIONS

International Search Report and Written Opinion of the International Searching Authority directed to related International Patent Application No. PCT/US2019/057425, dated Feb. 7, 2020; 9 pages.

(Continued)

*Primary Examiner* — Saumit Shah
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for configuring and implementing radio resource management (RRM) measurements for monitoring neighboring cells based on synchronization signal block (SSB) timing groups in an radio resource control (RRC) connected (RRC_CONNECTED) state. Various embodiments describe how to determine a set of SSB timing groups, and how to generate a receiver switching pattern based on the set of SSB timing groups and/or SSB scanning measurements. The embodiments also describe determination and implementation of an SSB scanning mode and an SSB Other embodiments may be described and claimed.

17 Claims, 8 Drawing Sheets

(56) References Cited

U.S. PATENT DOCUMENTS

| | | |
|---|---|---|
| 2018/0302819 A1 | 10/2018 | Lee et al. |
| 2019/0268813 A1* | 8/2019 | Ramachandra ..... H04W 56/001 |
| 2020/0022040 A1* | 1/2020 | Chen ................... H04W 56/001 |
| 2020/0100131 A1* | 3/2020 | Yang ................. H04W 36/0011 |
| 2020/0178130 A1* | 6/2020 | Pakniat ................. H04L 5/0048 |
| 2020/0314946 A1* | 10/2020 | Tsuboi ................. H04W 24/10 |
| 2021/0235513 A1* | 7/2021 | Kim ................. H04W 74/0816 |

FOREIGN PATENT DOCUMENTS

| | | |
|---|---|---|
| WO | WO 2018175891 A | 9/2018 |
| WO | 2018-185662 A1 | 10/2018 |

OTHER PUBLICATIONS

3GPP; TSG RAN; WG1; LG Electronics, Considerations on RRM measurements to reduce UE power (Meeting No. 94), R1-1810309, Agenda Item No. 7.2.9.3, Oct. 8-12, 2018; 2 pages.

Fujitsu, On remaining details of synchronization signal, 3GPP TSG RAN WG1 #90bis R1-1717713, Oct. 2, 2017.

Intel Corporation, Measurement gap in NR, 3GPP TSG RAN WG2 #99bis R2-1710591, Sep. 29, 2017.

Intel Corporation, On measurement of multiple frequency layers with gap, 3GPP TSG RAN WG4 #84bis R4-1710368, Oct. 2, 2017.

Huawei, HiSilicon, Further discussion on measurement in multiple frequency layers with gaps [online], 3GPP TSG RAN WG4 #84bis R4-1711230, Oct. 2, 2017.

Ericsson, Further aspects of measurement gap design for NR with multiple layers, 3GPP TSG RAN WG4 #84bis R4-1802088, Feb. 19, 2018.

LG Electronics, Discussion on measurement gap configuration in multiple frequency layers for NR, 3GPP TSG RAN WG4 #84bis R4-1710614, Oct. 2, 2017.

Chinese Office Action directed the related Chinese Application No. 201980069871.X, mailed Jan. 11, with English-language machine translation attached; 16 pages.

* cited by examiner

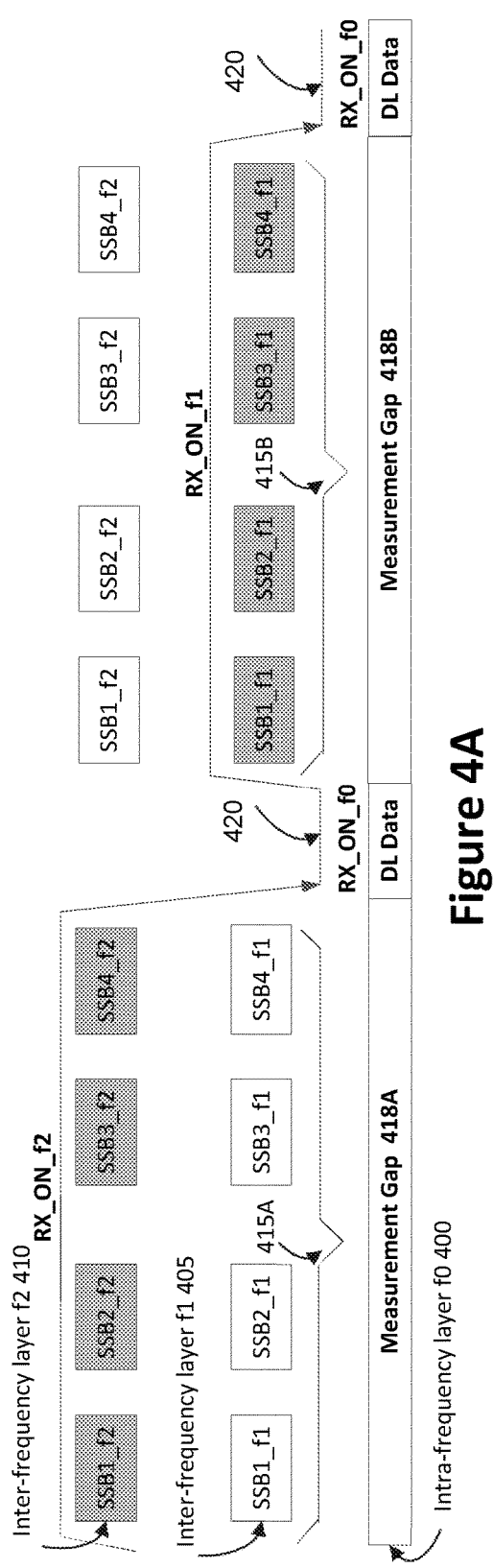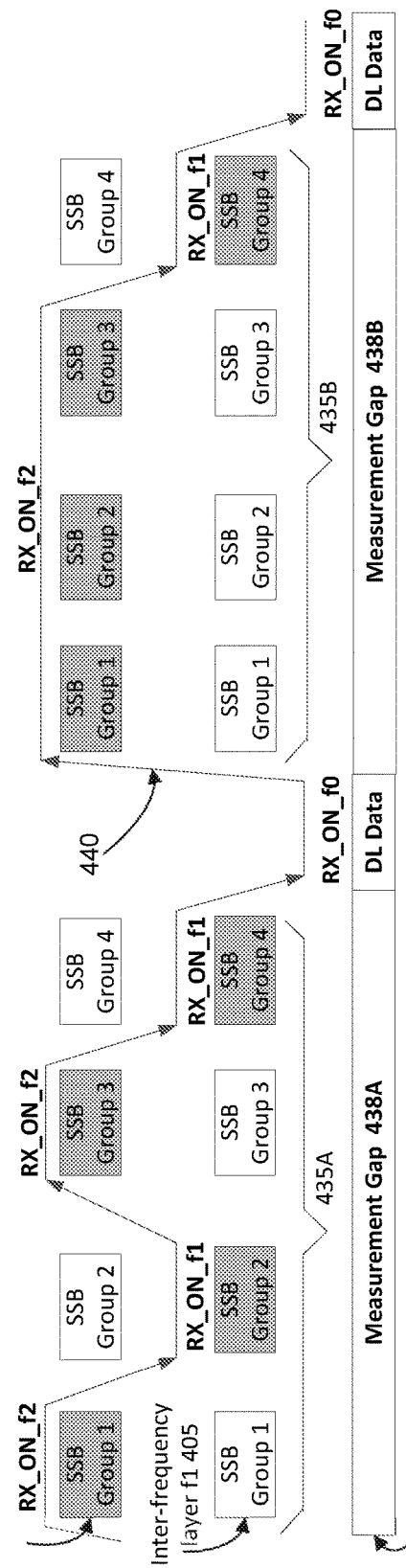
Figure 4A
Figure 4B

DYNAMIC RADIO FREQUENCY SWITCHING IN NEW RADIO FOR RADIO RESOURCE MANAGEMENT IN RADIO RESOURCE CONTROL CONNECTED STATE

CROSS REFERENCE TO RELATED APPLICATION

The present application is a National Stage entry from PCT/US2019/057425 filed on Oct. 22, 2019, entitled "Dynamic Radio Frequency Switching in New Radio for Radio Resource Management in Radio Resource Control Connected State," which claims priority to U.S. Provisional Patent Application No. 62/750,464, filed Oct. 25, 2018, entitled "Dynamic Radio Frequency Switching for Inter-frequency Radio Resource Management (RRM) Measurements in Radio Resource Control (RRC) CONNECTED State," the entire disclosures of all of which are hereby incorporated by reference in their entireties.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In Fifth Generation (5G) new radio (NR), inter-frequency and/or intra-frequency radio resource management (RRM) measurements are required for a user equipment (UE) to monitor qualities of neighboring cells. Such a monitoring may be used for a handover in a radio resource control (RRC)_CONNECTED state and/or cell reselection in an RRC_IDLE state. In 5G NR, RRM measurements of one or more target neighboring cells may be based on measurements with respect to one or more synchronization signal blocks (SSBs) associated with the one or more target neighboring cells. In the RRC_CONNECTED state, more than one inter-frequency layer may need to be monitored. Based on existing RRM measurements with respect to SSB bursts in corresponding measurement gaps, it may not be efficient if the UE can measure only SSBs of one inter-frequency layer corresponding to one SSB burst within a scheduled measurement gap.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4A illustrates an example of RRM measurements in the RRC_CONNECTED state based on SSB bursts, according to various embodiments. FIG. 4B illustrates an example of RRM measurements in the RRC_CONNECTED state based on SSB timing groups, according to various embodiments.

DETAILED DESCRIPTION

Figure 1:
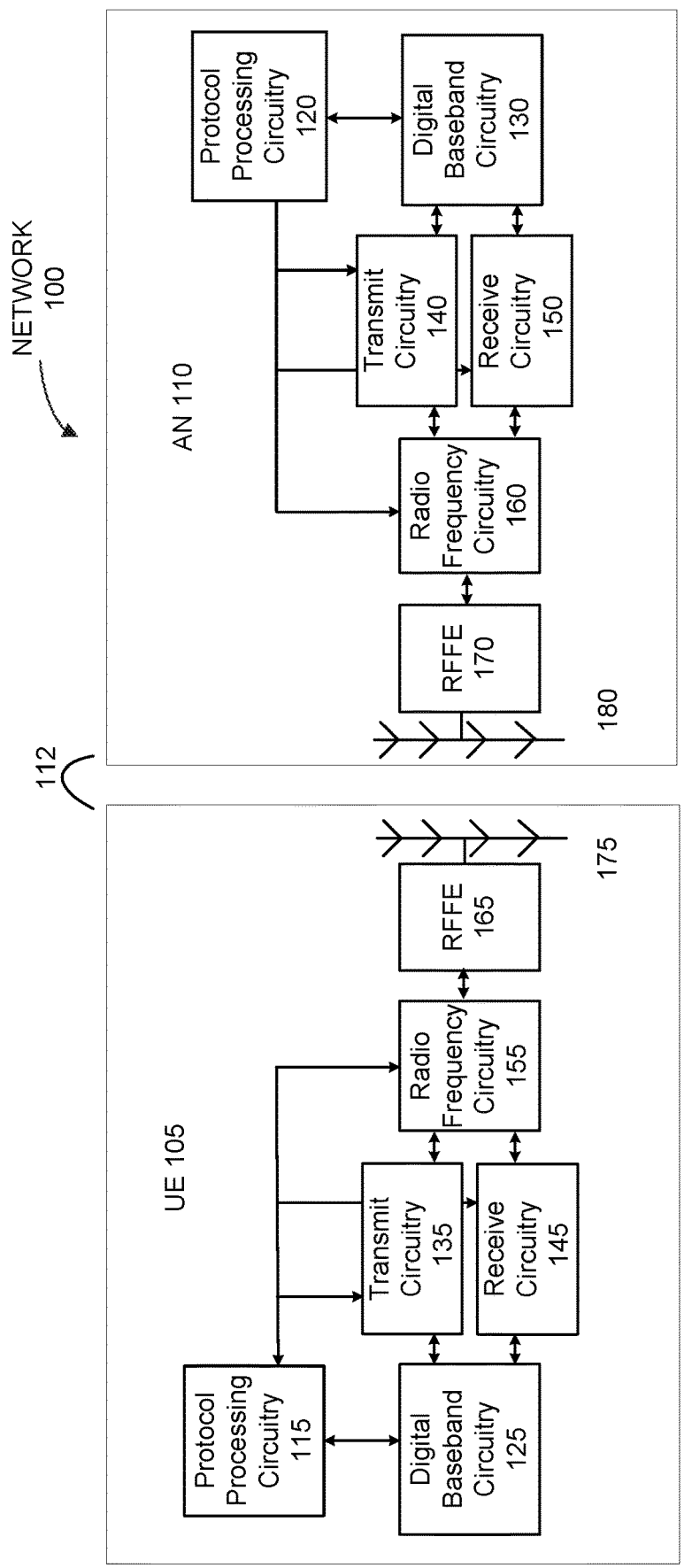
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The terms "coupled," "electronically coupled," "communicatively coupled," "connected," "electronically connected," "communicatively connected," along with derivatives thereof are used herein. The term "coupled" and/or "connected" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" and/or "directly connected" may mean that two or more elements are in direct contact with one another. The term "electronically coupled" and/or "electronically connected" may mean that two or more elements may be in contact with one another by a means of circuitry including through one or more vias, traces, wires, wire-bonds, or other interconnect connections, through a wireless communication channel or link, and/or the like.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

Conventionally in the RRC_CONNECTED state, a UE needs to perform RRM measurements to monitor signal qualities from one or more cells at more than one inter-frequency layer. The UE may switch its one or more receivers to operate at one of those inter-frequency layers that need to be monitored during one SSB burst. The UE may then switch the one or more receivers to operate at another of those inter-frequency layers during the next SSB burst. Thus, the SSB measurements may be performed at an inter-frequency layer per SSB burst. Such a measurement may or may not be operated within a measurement gap. Thus, not all of the SSBs of different inter-frequency layers are to be monitored in one SSB burst and/or during a measurement gap, which may affect an inter-frequency measurement update rate and/or affect related UE handover performance.

Embodiments described herein may include, for example, apparatuses, methods, and storage media for configuring and implementing RRM measurements for monitoring neighboring cells based on SSB timing groups in the RRC_CONNECTED state. A receiver switching pattern may be determined by the UE to effectively measure the SSBs at one or more inter-frequency layers within one SSB burst and/or measurement gap. Thus, the UE may operate more effectively in monitoring neighboring cells in the RRC_CONNECTED state.

FIG. 1 schematically illustrates an example wireless network 100 (hereinafter "network 100") in accordance with various embodiments herein. The network 100 may include a UE 105 in wireless communication with an AN 110. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), next-generation eNB (ng-eNB), next-generation NodeB (gNB or ng-gNB), NG-RAN node, cell, serving cell, neighbor cell, primary cell (PCell), secondary cell (SCell), primary SCell (PSCell),and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio resource control (c), radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIGS. 3A and 3B. The UE 105 may include protocol processing circuitry 115, which may implement one or more layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
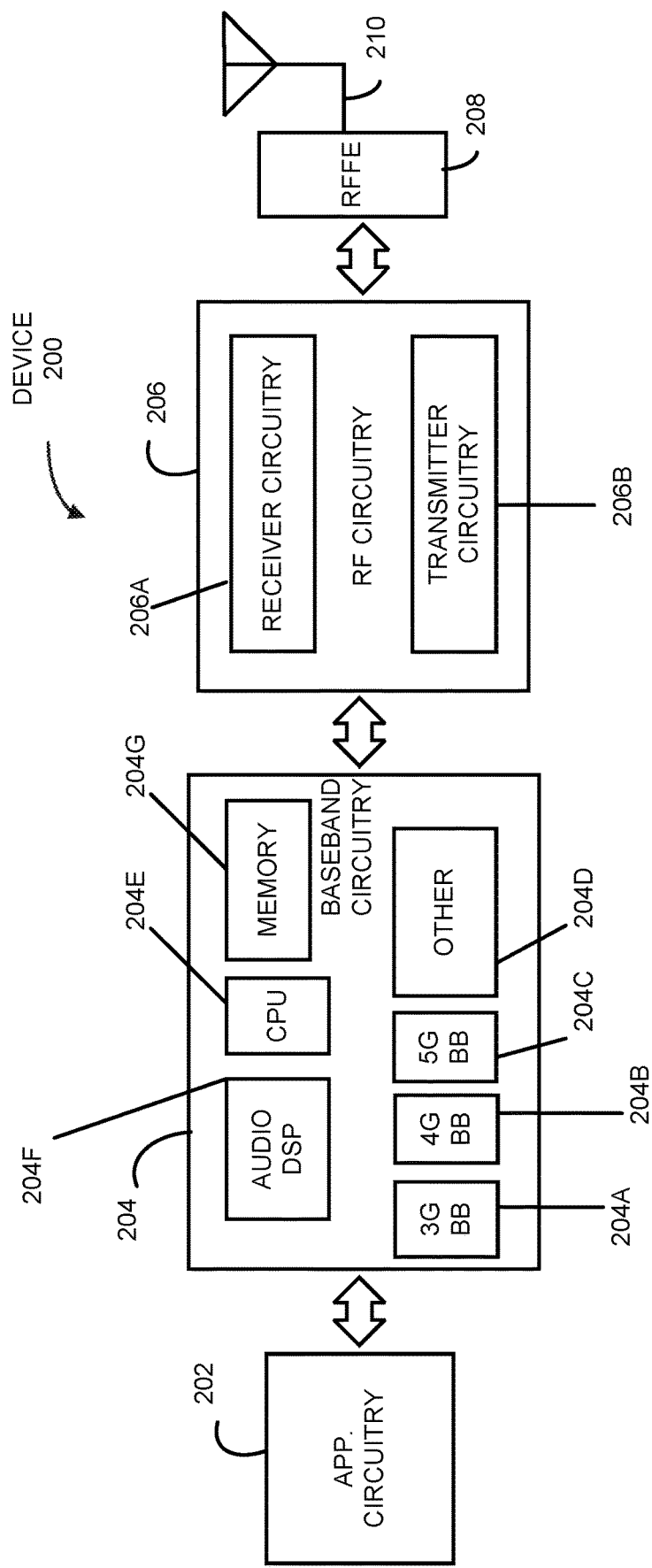
FIG. 2 illustrates example components of a device in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3A/3B, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

The AN 110 may generate and transmit a message to include a measurement gap configuration according to various embodiments herein. The UE 105 may decode the message transmitted by the AN 100 to determine a starting point of the configured measurement gap, according to various embodiments herein.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) and/or NR baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF signals and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

FIG. 3A illustrates an embodiment of a radio frequency front end 300 incorporating an mmWave RFFE 305 and one or more sub-6 GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6 GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

Figure 3B:
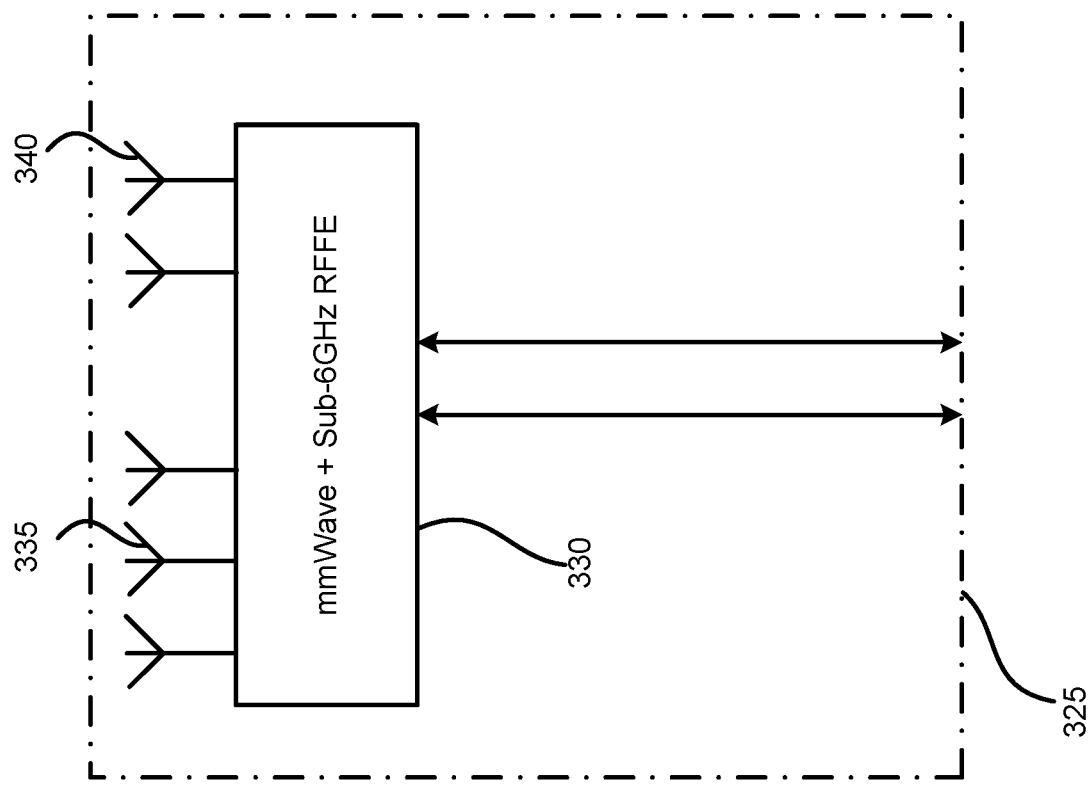
FIG. 3B illustrates an alternative RFFE in accordance with some embodiments.
Figure 3A:
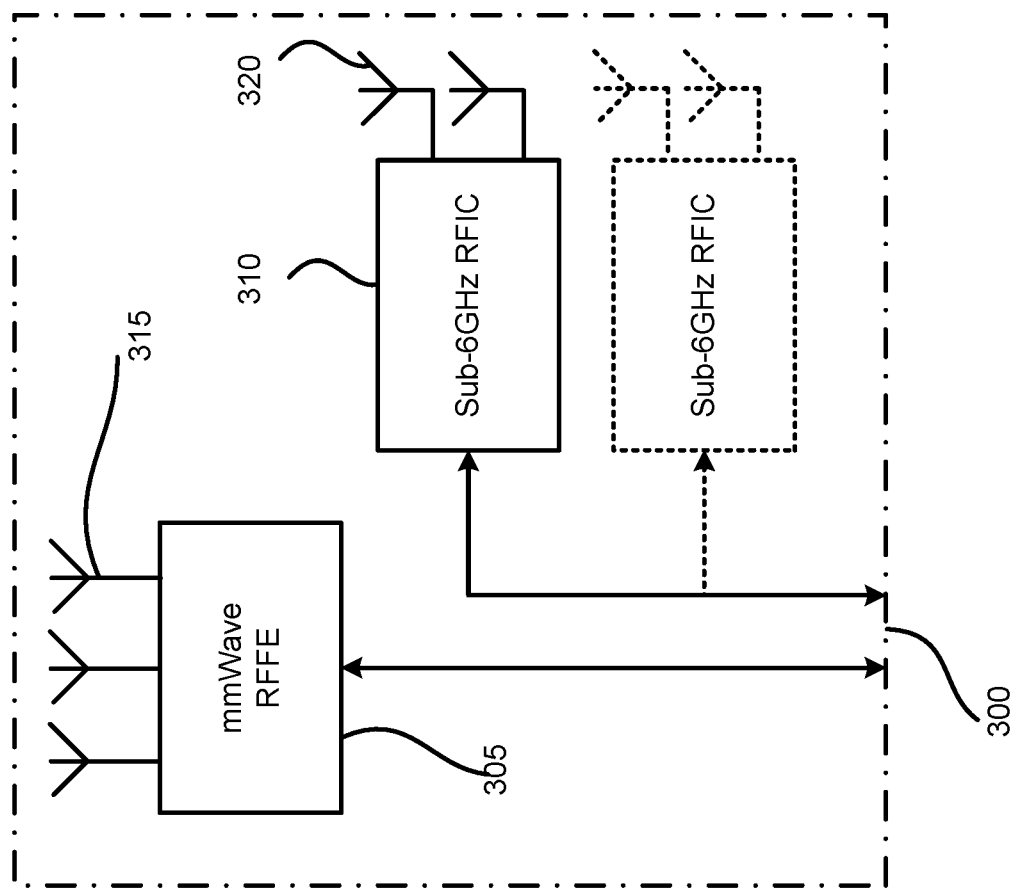
FIG. 3A illustrates an example radio frequency front end (RFFE) incorporating a millimeter Wave (mmWave) RFFE and one or more sub-millimeter wave radio frequency integrated circuits (RFICs) in accordance with some embodiments.

FIG. 3B illustrates an alternate embodiment of an RFFE 325. In this aspect both millimeter wave and sub-6 GHz radio functions may be implemented in the same physical RFFE 330. The RFFE 330 may incorporate both millimeter wave antennas 335 and sub-6 GHz antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

FIG. 4A illustrates an example of RRM measurements in the RRC_CONNECTED state based on SSB bursts, according to various embodiments. The bottom line represents an intra-frequency layer $f_0$ 400 of a serving cell of the UE 105. The middle line represents an inter-frequency layer $f_1$ 405 of the serving cell and the top line represents another inter-frequency layer $f_2$ 410 of the serving cell. In this example illustration, all of the neighboring cells may have the same burst pattern and they may be time-synchronized with one another. Note that various embodiments disclosed herein may apply to non-timely synchronized SSBs and/or different SSB burst patterns.

The neighboring cell transmission may include a first SSB burst 1 415A and a second SSB burst 2 415B, and more like SSB bursts (not shown). In each of the SSB bursts illustrated in FIG. 4A, there may be four SSBs (SSB1 SSB2_$f_1$, SSB3_$f_1$, and SSB4_$f_1$) at a first inter-frequency layer $f_1$ 405 and four SSBs (SSB1_$f_2$, SSB2_$f_2$, SSB3_$f_2$, and SSB4_$f_2$) at a second inter-frequency layer $f_2$ 410. In the RRC_CONNECTED state, the UE 105 may be required to monitor at least two inter-frequency layers, which means the UE 105 may switch its receiver(s) or RF receiver(s) to operate at those frequencies to receive the SSBs transmitted and/or perform RRM measurements. Since the RRM measurements are to be based on SSB bursts, the UE 105 may switch the receiver to operate at the inter-frequency layer $f_2$ 410 for a duration of the first SSB burst 1 415A within a first measurement gap 418A, and at the inter-frequency layer $f_1$ 405 for a duration of the second SSB burst 2 415B within a second measurement gap 418B. Those two receiver on time periods are illustrated as RX_ON_f1 and RX-ON_f2 in FIG. 4A. Thus, the SSB1_$f_2$, SSB2_$f_2$, SSB3_$f_2$, and SSB4_$f_2$ corresponding to the SSB burst 1 415A and the SSB1 SSB2_$f_1$, SSB3_$f_1$, and SSB4_$f_1$ corresponding to the SSB burst 2 415B may be measured by the UE 105 in two measurement gaps, which are illustrated by the gray-colored SSB blocks in FIG. 4A. Further, during a non-measurement gap time, the UE 105 may switch the receiver back to the intra-frequency layer $f_0$ 400 for downlink data reception, shown as RX_ON_f0 420. Note that an intra-frequency layer refers to a frequency that is associated with the same as a frequency used by a serving cell of the UE and an inter-frequency layer refers to a frequency that is associate with different from the frequency used by the serving cell of the UE.

The RRM measurements may include, but are not limited to, reference signal received power (RSRP), reference signal received quality (RSRQ), signal to noise and interference ratio (SINR), and received signal strength indicator (RSSI) measurements with respect to SSBs and/or channel state information reference signal (CSI_RS) in NR. Depending on a subcarrier spacing (SCS) of the reference signal, an SSB may include 1 or up to 64 SSBs. SSB bursts may be periodically transmitted with a pre-configured repetition period (RP), which may be from 5 milliseconds (ms) to 160 ms. In NR, an SSB burst configuration that indicates the SSB burst transmissions may be provided by the AN 110 to the UE 105 via neighboring cell via system information block type 1 (SIB1).

In some embodiments, the RRM measurements performed based on SSB bursts, in which the UE 105 may not be able to switch to operate at more than one inter-frequency layer during one scheduled measurement gap, may be referred to as an SSB scanning measurement herein. In such a scanning measurement, if the UE 105 needs to monitor SSBs at more than one inter-frequency layer, the UE may monitor each inter-frequency layer within more than one measurement gap.

In the NR RRC_CONNECTED state, the UE may need to monitor and measure neighboring cells at more than one inter-frequency layer, which may be used to prepare for inter-frequency handover in high mobility scenarios, to reduce or minimize call drop and/or other like situations. The RRM measurements may be performed by interrupting an intra-frequency downlink PDSCH and/or PDCCH reception based on one or more pre-configured measurement gap patterns by the AN 110. The UE 105 may switch the receiver to operate at an inter-frequency layer during the measurement gap and perform the RRM measurements accordingly. As above mentioned, the SSB burst-based RRM measurements may only measure one inter-frequency layer during one measurement gap period. By contrast, an RRM measurement based on SSB timing group may measure more than one inter-frequency layer during one measurement gap period to improve measurement update rates for respective measurement gaps.

FIG. 4B illustrates an example of RRM measurements in the RRC_CONNECTED state based on SSB timing groups, according to various embodiments. Similar to FIG. 4A, the bottom line represents the intra-frequency layer $f_0$ 400. The middle line represents the inter-frequency layer $f_1$ 405 and the top line represents the inter-frequency layer $f_2$ 410. In this example illustration, all of the neighboring cells may have the same burst pattern and they may be time-synchronized with one another. Note that various embodiments disclosed herein may apply to non-timely synchronized SSBs and/or different SSB burst patterns.

The neighboring cell transmission may include a first SSB burst 1 435A and a second SSB burst 2 435B, and more like SSB bursts (not shown). In each of the SSB bursts, there may be four SSB groups (SSB group 1, SSB group 2, SSB group 3, and SSB group 4) at both inter-frequency layer $f_1$ 405 and inter-frequency layer $f_2$ 410. The SSB groups may be referred to as SSB timing groups that group all the SSBs into one SSB group if those SSBs are aligned on a time scale when arriving at the UE 105. Note that the alignment of the SSBs may not be exact and it may allow a degree of tolerance. For example, there may be one or more SSBs arriving at the UE receiver at or around a time $t_0$. All of those SSBs may be grouped as an SSB group 1. All those grouped SSBs may have the same or different carrier frequencies and/or be at different inter-frequency layers. Thus, those SSBs may be at the inter-frequency layer $f_1$ 405 and inter-frequency layer $f_2$ 410, or some other inter-frequency layer(s) that is not shown in FIG. 4B.

In embodiments, the UE 105 may measure SSB(s) from neighboring cells within an SSB burst, in the RRC_CONNECTED state. Thus, the UE 105 may determine one or more SSB time groups that include SSBs from neighboring cells operating at one or more inter-frequency layers. Such a determination may be based on respective power levels and/or other signal quality indicators of the SSBs according to RRM measurements within one or more SSB bursts and/or measurement gaps. Further detail in this regard is to be discussed infra with respect to FIG. 5. Thus, a receiver switching pattern may be determined based on the SSBs that need to be measured (e.g., one or more pre-selected SSBs). In the example illustrated by FIG. 4B, SSB group 1 and SSB group 3 may have pre-selected time-synchronized SSBs at the inter-frequency layer $f_1$; SSB group 2 may have pre-selected time-synchronized SSBs at the inter-frequency layer $f_1$ and the inter-frequency layer $f_2$; and SSB group 4 may have pre-selected time-synchronized SSBs at the inter-frequency layer $f_2$. In accordance, a receiver switching pattern 440 may be determined. According to the receiver switching pattern 440, the UE 105 may switch its receiver(s) to receive and measure the SSB group 1 and SSB group 3 at the inter-frequency layer $f_1$ during the first and second SSB bursts 1/2 435A/435B and/or the measurement gaps 418A/418B. The UE 105 may switch the receiver(s) to receive and measure the SSB group 2 in a time-multiplexed fashion, at the inter-frequency layer $f_1$ during the first SSB burst 1 435A and/or a measurement gap 438A, and at the inter-frequency layer $f_2$ during the second SSB burst 2 435B and/or a measurement gap 438B. The UE 105 may switch the receiver(s) to receive and measure the SSB group 4 at the inter-frequency layer $f_1$ during the first and second SSB bursts 435A/435B and/or measurement gaps 438A/438B.

The UE 105 may switch the receiver(s) back to operate at the intra-frequency layer $f_0$ if no measurement gap is scheduled, as shown "RX_ON_f0" in FIG. 4B. In FIG. 4B, the SSB timing groups that are to be measured are colored in gray. In the example of FIG. 4B, two inter-frequency layers ($f_1$ and $f_2$) are both measured within one measurement gap. Since the UE 105 is only to monitor two inter-frequency layers, measurement update rates of respective SSB timing groups 1, 3, and 4 are one per one measurement gap; and a measurement update rate of SSB timing group 2 is one per two measurement gaps.

In embodiments, the UE 105 may determine one or more SSB timing groups with corresponding inter-frequency layers to measure based on a scan measurement of SSBs with one or more measurement gaps, according to burst-based measurements as illustrated with respect to FIG. 4A. Such a scan measurement may be performed in one or more measurement gaps. For example, if the UE 105 is to monitor three inter-frequency layers for neighboring cells, the UE 105 may need to perform the scan measurement in three measurement gaps for respective three inter-frequency layers. The UE 105 may then determine one or more SSB timing groups based on the determined one or more SSBs that need to be measured in the RRC_CONNECTED state.

In embodiments, the UE 105 may determine the receiver switching pattern based on an SSB timing group pattern after detecting/determining to measure one of more SSBs or SSB timing groups at specific frequency layers, instead of an SSB burst pattern.

In embodiments, if an SSB timing group has time colliding SSBs from different inter-frequency layers, e.g., the SSB group 2 in FIG. 4B, the UE 105 may determine to measure the SSBs at different frequency layers in a time-multiplexed fashion. For example, FIG. 4B illustrates that the UE receiver may switch to operate at inter-frequency layer $f_1$ in the first SSB burst 1 435A and/or the first measurement gap 438A to measure the SSB group 2 at inter-frequency layer $f_1$, and switch to operate at inter-frequency layer $f_2$ to measure the SSB group 2 at inter-frequency layer $f_2$ in the second SSB burst 1 435B and/or the second measurement gap 438B.

In embodiments, if an SSB group contains SSBs that need to be monitored only at one inter-frequency layer, e.g., the SSB group 1, 3, or 4 in FIG. 4B, the UE 105 may determine to measure the SSB group at that inter-frequency layer within each scheduled measurement gap so that the measurement update rate can be one per one measurement gap. The measurement update rate refers to a rate that the RRM measurement regarding neighboring cell monitoring can perform with respect to a specific SSB in measurement gaps.

In embodiments, the UE 105 may determine to switch the receiver to operate at the intra-frequency layer for data transmission and/or reception if a measurement gap is not scheduled.

By comparing the RX_ON time at inter-frequency layers in FIGS. 4A and 4B, it can be concluded that the UE 105 may be able to monitor/measure the SSBs at different inter-frequency layers within one SSB burst and/or measurement gap according to the SSB timing group based RRM measurements. Further, respective measurement update rate may be increased accordingly. For example, the SSBs 1 and 3 at inter-frequency layer $f_1$ and SSB 4 at inter-frequency layer $f_2$ may increase their respective measurement update rate from 50% to 100%.

Figure 5:
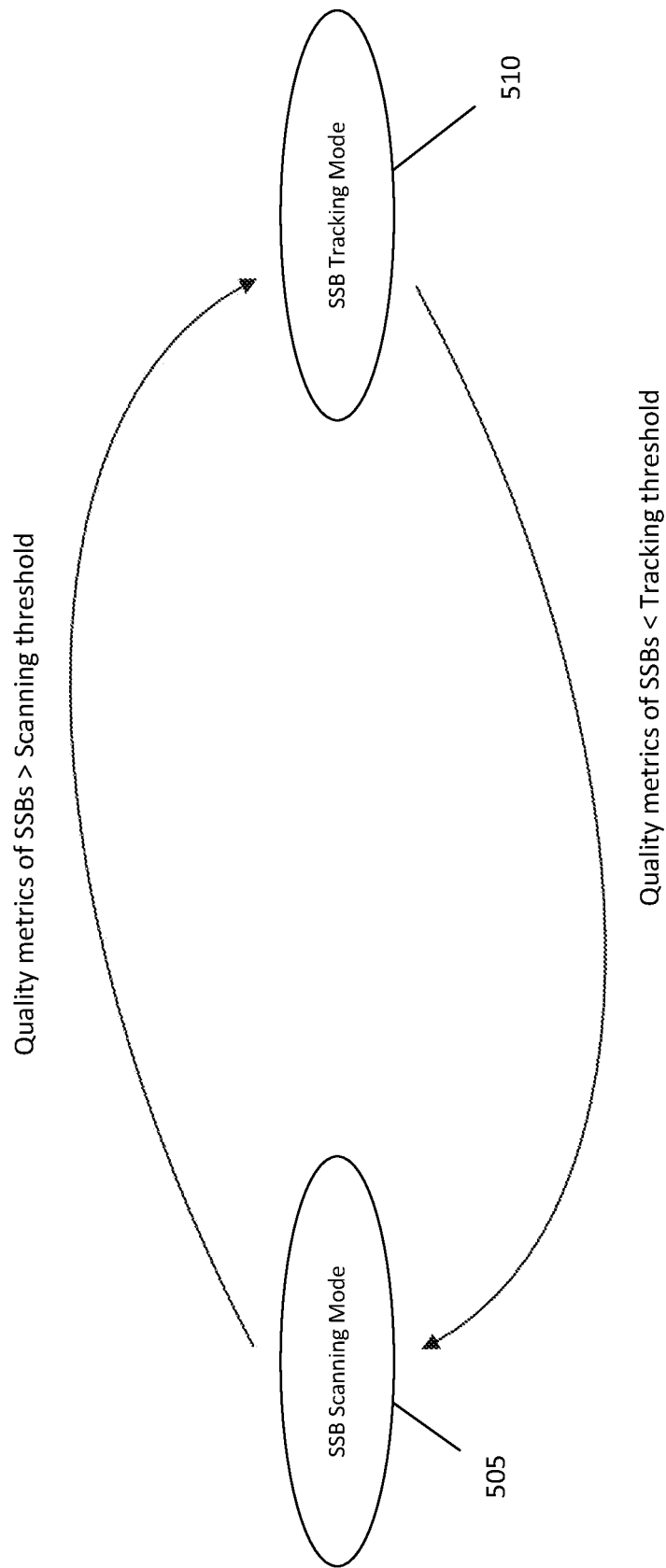
FIG. 5 illustrates an example operation flow to facilitate a process of neighboring cell monitoring in the RRC_CONNECTED state, in accordance with various embodiments.

FIG. 5 illustrates an example operation flow 500 to facilitate a process of neighboring cell monitoring in the RRC_CONNECTED state, in accordance with various embodiments as illustrated with respect to FIGS. 4A and 4B. The operation flow 500 may include two modes, an SSB scanning mode 505 and an SSB tracking mode 510. In the SSB scanning mode 505, the UE 105 may perform one or more SSB scanning measurements, which may be the same as or substantially similar to the RRM measurements based on SSB bursts described with respect to FIG. 4A. In the SSB tracking mode 510, the UE 105 may perform one or more SSB tracking measurements, which may be the same as or substantially similar to the RRM measurements based on SSB timing groups described with respect to FIG. 4B.

In embodiments, one or more SSBs may be selected based on one or more the SSB scanning measurements in the SSB scanning mode 505 within one or more measurement gaps. If quality metrics of those SSBs are greater than a scanning threshold, the UE 105 may switch to the SSB tracking mode 510. A quality metric may include, but is not limited to, reference signal received power (RSRP), reference signal received quality (RSRQ), signal to noise and interference (SINR), and received signal strength indicator (RSSI) measurement results of the SSBs. In some embodiments, the UE 105 may select the strongest one or more SSBs based on the scanning measurements. The UE 105 may select the one or more SSBs based on other criteria with respect to the quality metrics of the SSBs. A quality metric may consider one or more of those measurement results with respect to the SSB. One scanning threshold, which may include one value or a set of values, may be configured in accordance by the AN 110 or pre-determined by the UE 105. The UE 105 may include the one or more selected SSBs into one or more SSB timing groups based on the timing information of the selected SSBs.

In embodiments, the UE 105 may perform SSB tracking measurements with respect to selected SSBs in their corresponding SSB timing groups, in the SSB tracking mode 510 within respective scheduled measurement gaps. If corresponding quality metrics of the measured SSBs are smaller than a tracking threshold, which may include one value or a set of values corresponding to the measurement results used in this regard (e.g., RSRP, RSRQ, SINR, RSSI, or a combination thereof), the UE 105 may switch back to the SSB scanning mode 505. Note that various algorithm and/or weights may be used to form the determination approach in this regard.

In embodiments, the scanning threshold may be used to ensure that the selected SSBs should be above certain quality to be monitored and/or measured in the RRC_CONNECTED state. The tracking threshold may ensure that the SSBs should be re-selected if the quality of the selected SSBs degraded due to various reasons in the network, such as UE mobility, interferences, and other like causes.

Figure 6:
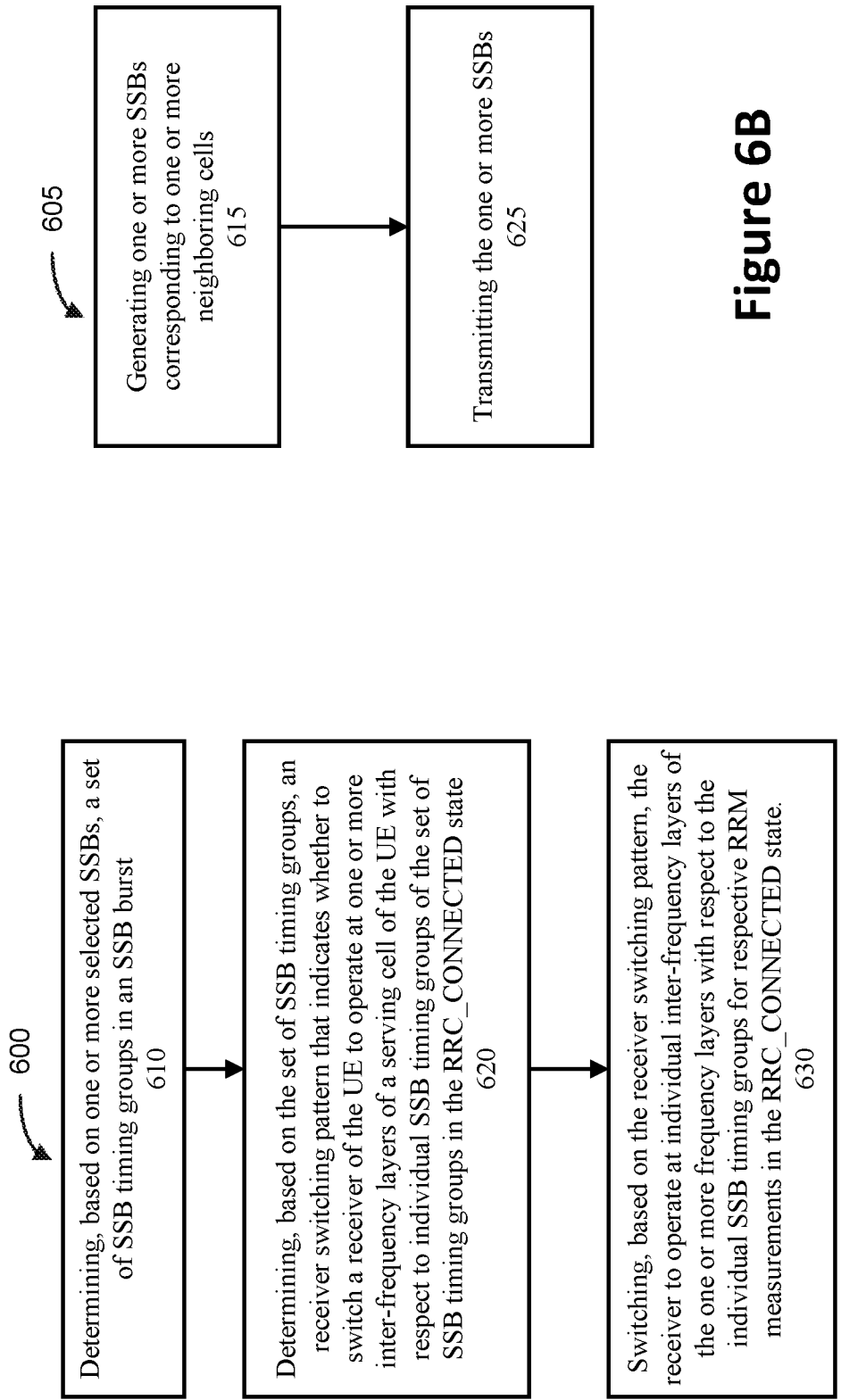
FIG. 6A illustrates an operation flow/algorithmic structure to facilitate a process of receiver switching pattern determination and implementation in the RRC-CONNECTED state by a UE, in accordance with various embodiments.
FIG. 6B illustrates an operation flow/algorithmic structure to facilitate the process of receiver switching pattern determination and implementation in the RRC-CONNECTED state by an AN, in accordance with various embodiments.

FIG. 6A illustrates an operation flow/algorithmic structure 600 to facilitate a process of receiver switching pattern determination and implementation in the RRC_CONNECTED state by the UE 105, in accordance with various embodiments as illustrated with respect to FIGS. 4A/4B and 5. The operation flow/algorithmic structure 600 may be performed by the UE 105 or circuitry thereof.

The operation flow/algorithmic structure 600 may include, at 610, determining, based on one or more selected SSBs, a set of SSB timing groups in an SSB burst. The one or more selected SSBs may be determined based on one or more SSB scanning measurements, according to various embodiments described with respect to FIG. 4A. each SSB timing group of the set of SSB timing groups may include one or more SSBs that are time-co-related. For example, the SSB in one SSB timing group may have the same transmission time or sufficiently close transmission times at the AN 110, and/or the same reception time or sufficiently close reception times at the UE 105. The time-co-located SSBs may be determined based on the decode one or more SSB burst configuration coupled with the reception of the SSBs by the UE 105.

In embodiments, the SSB scanning measurements may be performed at per frequency layer and or per neighboring cell. The SSB scanning measurements may be performed based on SSB bursts, according to the decoded one or more neighboring cell SSB burst configurations.

Additionally or alternatively, the UE 105 may determine the SSB timing groups based on one or more SSB burst configurations with respect to one or more neighboring cells. The UE 105 may receive and/or obtain the one or more neighboring cell SSB burst configurations via system information block type 1 (SIB1) or other system signaling. Each neighboring cell SSB burst configuration may indicate one or more SSB bursts transmitted with the neighboring cell at one or more inter-frequency layers.

The operation flow/algorithmic structure 600 may include, at 620, generating, based on the set of SSB timing groups, an receiver switching pattern that indicates whether to switch a receiver of the UE to operate at one or more inter-frequency layers associated with a serving cell of the UE with respect to individual SSB timing groups of the set of SSB timing groups in the RRC_CONNECTED state. The receiver switching pattern may be used to configure the UE 105 to switch on and off one or more receivers of the UE 105. The one or more receivers may include one or more RF portions and one or more baseband portions, with respect to descriptions regarding FIGS. 1 and/or 2. The one or more receivers may further include one or more intermediate frequency (IF) sections for receivers operating in FR2 ranges.

The operation flow/algorithmic structure 600 may include, at 630, switching, based on the receiver switching pattern, the receiver to operate at individual inter-frequency layers of the one or more inter-frequency layers with respect to the individual SSB timing groups for respective SSB measurements in the RRC_CONNECTED state. The SSB measurements may be referred to as SSB tracking measurements as described with respect to FIG. 5.

In embodiments, the determine the set of SSB timing groups, the UE 105 may perform one or more SSB scanning measurements at the one or more inter-frequency layers with respect to one or more SSB bursts, select one or more SSBs that are to be measured at respective one or more inter-frequency layers for neighboring cell monitoring in the RRC_CONNECTED state, and determine one or more SSB timing groups based on the selected one or more SSBs and their corresponding timing information.

FIG. 6B illustrates an operation flow/algorithmic structure 605 to facilitate the process of receiver switching pattern determination and implementation in the RRC_CONNECTED state by the AN 110, in accordance with various embodiments as illustrated with respect to FIGS. 4A and 4B. The AN 110 may be an eNB in an NR related network, operating in an EN-DC mode, NR CA mode, NR-NR DC mode, or other NR standalone mode. The operation flow/algorithmic structure 605 may be performed by the AN 110 or circuitry thereof.

The operation flow/algorithmic structure 605 may include, at 615, generating, based on one or more SSB burst configurations, one or more SSBs with respect to one or more neighboring cells. The one or more SSBs may be operating at one or more inter-frequency layers associated with the serving cell of the UE. The SSBs with respect to different neighboring cells may correspond to the same or different SSB burst patterns.

The operation flow/algorithmic structure 605 may further include, at 625, transmitting the one or more SSBs. The one or more SSBs may be transmitted for neighboring cell monitoring purpose and/or other like purposes.

In embodiments, the AN 110 may further transmit one or more SSB burst configurations with respect to one or more neighboring cells to the UE. The one or more SSB burst configurations may indicate the transmissions of the one or more SSBs corresponding to one or more neighboring cells.

Figure 7:
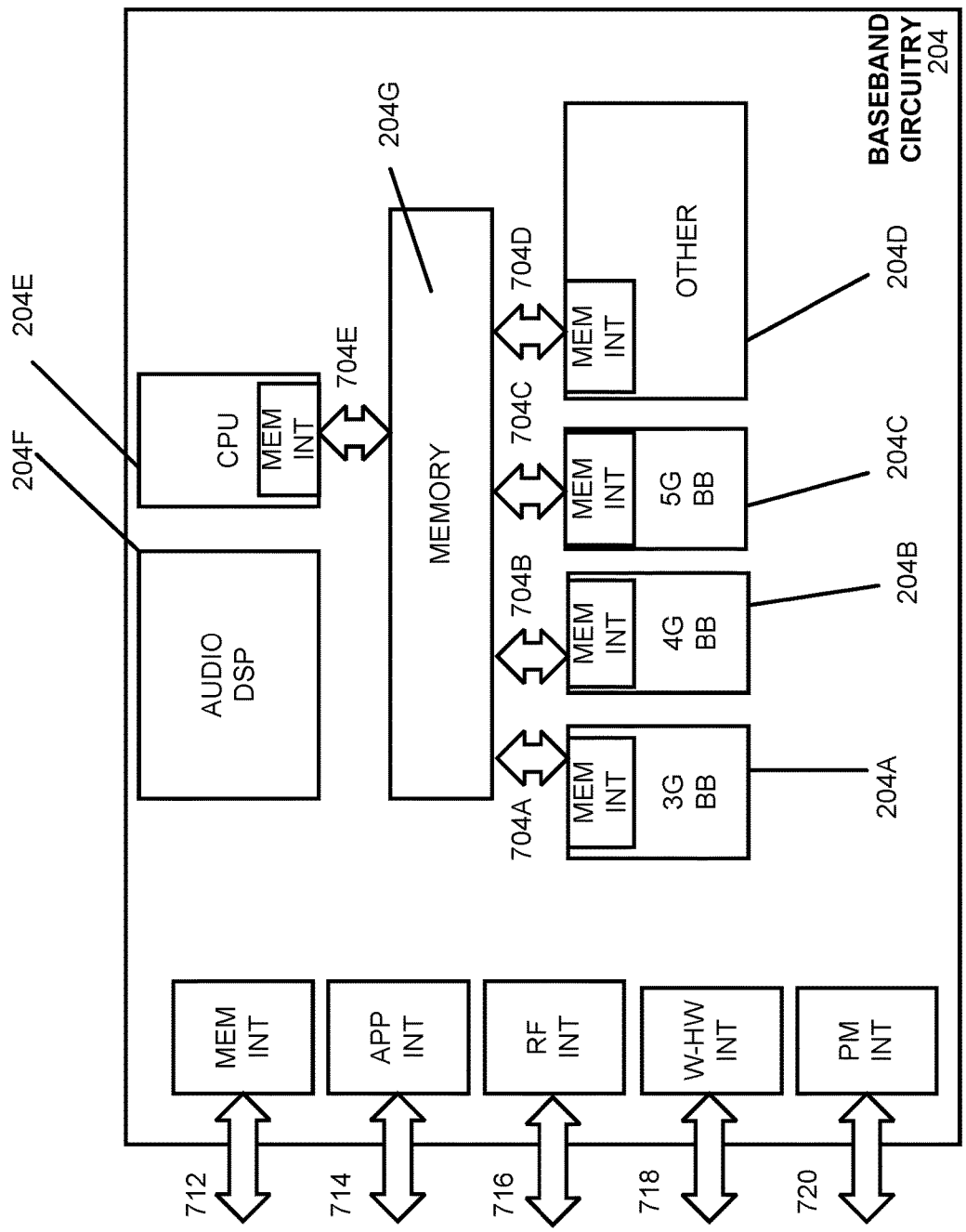
FIG. 7 illustrates example interfaces of baseband circuitry in accordance with various embodiments.

FIG. 7 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 600, in accordance with various embodiments with respect to FIGS. 4A/4B and 5. The processors 204A-204E of the AN 110 may perform some or all of the operation flow/algorithmic structure 605, in accordance with various embodiments with respect to FIGS. 4A/4B and 5. Each of the processors 204A-204E may include a memory interface, 704A-704E, respectively, to send/receive data to/from the memory 204G. The processors 204A-204E of the UE 105 may be used to process the SFTD measurement; the processors 204A-204E of the AN 110 may be used to generate the SFTD measurement configuration.

The baseband circuitry 204 may further include one or more interfaces to communicatively couple to other circuitries/devices, such as a memory interface 712 (e.g., an interface to send/receive data to/from memory external to the baseband circuitry 204), an application circuitry interface 714 (for example, an interface to send/receive data to/from the application circuitry 202 of FIG. 2), an RF circuitry interface 716 (for example, an interface to send/receive data to/from RF circuitry 206 of FIG. 2), a wireless hardware connectivity interface 718 (for example, an interface to send/receive data to/from Near Field Communication (NFC) components, Bluetooth® components (for example, Bluetooth® Low Energy), Wi-Fi® components, and other communication components), and a power management interface 720 (for example, an interface to send/receive power or control signals).

Figure 8:
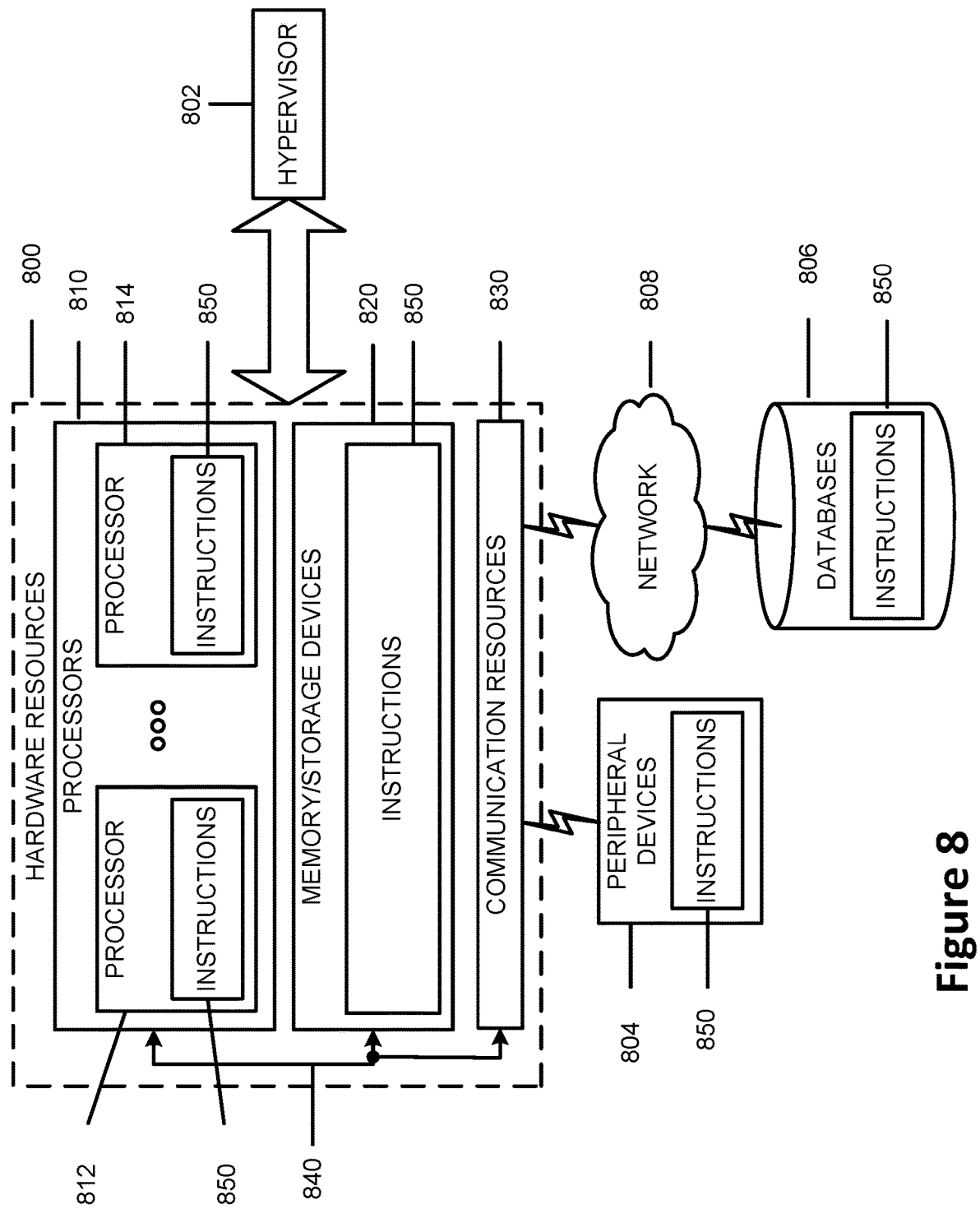
FIG. 8 illustrates hardware resources in accordance with various embodiments.

FIG. 8 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (for example, network function virtualization (NFV)) is utilized, a hypervisor 802 may be executed to provide an execution environment for one or more network slices/sub-slices to utilize the hardware resources 800.

The processors 810 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein, e.g., the operation flows 600 and 605. For example, in an embodiment in which the hardware resources 800 are implemented into the UE 105, the instructions 850 may cause the UE to perform some or all of the operation flow/algorithmic structure 600. In other embodiments, the hardware resources 800 may be implemented into the AN 110. The instructions 850 may cause the AN 110 to perform some or all of the operation flow/algorithmic structure 605. The instructions 850 may reside, completely or partially, within at least one of the processors 810 (for example, within the processor's cache memory), the memory/storage devices 820, or any suitable combination thereof. Further, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include a method comprising: determining, based on one or more selected synchronization signal blocks (SSBs), a set of SSB timing groups in an SSB burst; generating, based on the set of SSB timing groups, an receiver switching pattern that indicates whether to switch a receiver of the UE to operate at one or more inter-frequency layers associated with a serving cell of the UE with respect to individual SSB timing groups of the set of SSB timing groups in a radio resource control_connected (RRC_CONNECTED) state; and switching, based on the receiver switching pattern, the receiver to operate at individual inter-frequency layers of the one or more frequency layers with respect to the individual SSB timing groups for respective radio resource management (RRM) measurements in the RRC_CONNECTED state.

Example 2 may include the method of example 1 and/or some other example herein, wherein the one or more inter-frequency layers are to be monitored and/or measured by RRM measurements by a user equipment (UE).

Example 3 may include the method of examples 1-2 and/or some other examples herein, wherein the one or more inter-frequency layers refer to the one or more carrier frequencies that are different from the carrier frequency used between the UE and a serving cell of the UE.

Example 4 may include the method of examples 1-2 and/or some other examples herein, wherein the RRM measurements are SSB scanning measurements or SSB tracking measurements.

Example 5 may include the method of examples 1-4 and/or some other examples herein, wherein determining the set of SSB timing groups is to perform, upon reception of one or more SSB burst configurations, an SSB scanning measurement at the one or more frequency layers with respect to one or more SSB bursts; select, based on the SSB scanning measurement, one or more SSBs that are to be measured at respective one or more inter-frequency layers for neighboring cell monitoring in the RRC_CONNECTED state; and determine one or more SSB timing groups based on the selected one or more SSBs and their corresponding timing information.

Example 6 may include the method of example 5 and/or some other example herein, wherein to select the one or more SSBs is to determine, based on the SSB scanning measurement, individual quality metrics of the one or more SSBs are greater than a scanning threshold; and select the one or more SSBs.

Example 7 may include the method of example 6 and/or some other examples herein, wherein the respective quality metrics are measurement results based at least on one of reference signal received power (RSRP), reference signal received quality (RSRQ), signal to noise and interference ratio (SINR), and received signal strength indicator (RSSI) measurement results in the SSB scanning measurement.

Example 8 may include the method of example 6 and/or some other examples herein, further comprising performing, based on the receiver switching pattern, one or more SSB tracking measurements with respect to the individual inter-frequency layers of the one or more frequency layers with respect to the individual SSB timing groups for the respective radio resource management (RRM) measurements in the RRC_CONNECTED state.

Example 9 may include the method of example 8 and/or some other examples herein, wherein the set of SSB groups is a first set of SSB groups and the SSB scanning measurement is a first SSB scanning measurement at the one or more inter-frequency layers with respect to a first set of the one or more SSB bursts.

Example 10 may include the method of example 9 and/or some other examples herein, further comprising: determining, based on performing the one or more SSB tracking measurements, that at least one quality metric of individual quality metrics of one or more measured SSBs is lower than a tracking threshold; and performing a second SSB scanning measurement at the one or more inter-frequency layers with respect to a second set of one or more SSB bursts.

Example 11 may include the method of examples 1-10 and/or some other examples herein, wherein the receiver switching pattern is to indicate whether to switch the receiver to operate at one inter-frequency layer of the one or more inter-frequency layers with respect to a respective SSB timing group of the set of SSB timing groups during one or more SSB bursts corresponding to respective measurement gaps.

Example 12 may include the method of examples 1-10 and/or some other examples herein, wherein the receiver switching pattern is to indicate to switch the receiver to operate at one inter-frequency layer of the one or more inter-frequency-layers with respect to one SSB timing group of the set of the SSB timing groups if the one SSB timing group includes only one selected SSB of the one or more selected SSBs.

Example 13 may include the method of example 12 and/or some other examples herein, wherein the receiver switching pattern is to indicate to switch the receiver to operate at the one inter-frequency until the determination that the individual quality metrics of the one or more measured SSBs are lower than the tracking threshold.

Example 14 may include the method of examples 1-10 and/or some other examples herein, wherein the receiver switching pattern is to indicate to switch the receiver to operate at two or more inter-frequency layers with respect to one SSB timing group of the set of the SSB timing groups in a time-multiplexed fashion, if the one SSB timing group includes two or more selected SSBs of the two or more inter-frequency layers.

Example 15 may include the method of examples 1-10 and/or some other examples herein, wherein the receiver switching pattern is to indicate to switch the receiver to operate at an intra-frequency layer associated with the serving cell if no SSB timing group is to be measured.

Example 16 may include the method of examples 1-10 and/or some other examples herein, further comprising decoding, upon reception of the one or more SSB burst configurations, the one or more SSB burst configurations with respect to monitoring neighboring cell SSBs in the RRC-CONNECTED state.

Example 17 may include the method of example 16 and/or some other examples herein, further comprising receiving the one or more SSB burst configurations, the one or more SSB burst configurations with respect to monitoring neighboring cell SSBs.

Example 18 may include a method comprising: performing, upon reception of one or more SSB burst configurations, an SSB scanning measurement at a plurality of inter-frequency layers with respect to one or more SSB bursts; determining, based on the SSB scanning measurement, a set of SSB timing groups for one or more incoming SSB bursts; generating, based on the set of SSB timing groups, an receiver switching pattern that indicates whether to switch a receiver of the UE to operate at the plurality of inter-frequency layers with respect to individual SSB timing groups of the set of SSB timing groups for the one or more incoming SSB bursts; and switching, based on the receiver switching pattern, the receiver to operate at individual inter-frequency layers of the plurality of inter-frequency layers with respect to the individual SSB timing groups for one or more SSB tracking measurements of the one or more incoming SSB bursts in a radio resource control_connected (RRC_CONNECTED) state.

Example 19 may include the method of example 18 and/or some other examples herein, wherein determining the set of SSB timing groups is to select, based on the SSB scanning measurement, one or more SSBs that are to be measured at the individual inter-frequency layers of the plurality of inter-frequency layers for neighboring cell monitoring in the RRC_CONNECTED state; and determine one or more SSB timing groups based on the selected one or more SSBs and their corresponding timing information.

Example 20 may include the method of example 18 and/or some other examples herein, further comprising performing, based on the receiver switching pattern, one or more SSB tracking measurements with respect to the individual SSB timing groups at the individual inter-frequency layers of the plurality of inter-frequency layers.

Example 21 may include the method of example 20 and/or some other examples herein, further comprising determining, based on the one or more SSB tracking measurements, that at least one quality metric of individual quality metrics of one or more SSBs that are measured one or more SSBs is lower than a tracking threshold.

Example 22 may include the method of examples 18-20 and/or some other examples herein, wherein the SSB scanning measurement is a first SSB scanning measurement, and the method is to further comprise determining to perform a second SSB scanning measurement in the one or more incoming SSB bursts.

Example 23 may include the method of examples 1-22 and/or some other examples herein, wherein the method is performed by the UE or a portion thereof.

Example 24 may include a method comprising: generating, based on one or more SSB burst configurations, one or more synchronization signal blocks (SSBs) with respect to one or more neighboring cells; and transmitting the one or more SSBs.

Example 25 may include the method of example 24 and/or some other examples herein, wherein transmitting the one or more SSBs is to transmit the one or more SSBs at one or more inter-frequency layers.

Example 26 may include the method of example 25 and/or some other examples herein, wherein the one or more inter-frequency layers are one or more inter-frequency layers with respect to a serving cell of a user equipment (UE).

Example 27 may include the method of examples 24-26 and/or some other examples herein, further comprising generating the one or more SSB burst configurations; and transmitting the one or more SSB burst configurations.

Example 28 may include the method of example 27 and/or some other examples herein, wherein the one or more SSB burst configurations correspond to one or more neighboring cells.

Example 29 may include the method of examples 24-28 and/or some other examples herein, wherein the method is performed by the AN or a portion thereof.

Example 30 may include an apparatus comprising means to perform one or more elements of the method described in or related to any of examples 1-29, or any other method or process described herein.

Example 31 may include one or more non-transitory computer-readable media comprising instructions to cause an electronic device, upon execution of the instructions by one or more processors of the electronic device, to perform one or more elements of the method described in or related to any of examples 1-29, or any other method or process described herein.

Example 32 may include an apparatus comprising logic, modules, and/or circuitry to perform one or more elements of the method described in or related to any of examples 1-29, or any other method or process described herein.

Example 33 may include a method, technique, or process as described in or related to any of examples 1-29, or portions or parts thereof.

Example 34 may include an apparatus comprising: one or more processors and one or more computer-readable media comprising instructions that, when executed by the one or more processors, cause the one or more processors to perform the method, techniques, or process as described in or related to any of examples 1-29, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A non-transitory computer-readable medium (CRM) comprising instructions to, upon execution of the instructions by one or more processors of a user equipment (UE), cause the UE to perform operations, the operations comprising:
    determining, based on one or more selected synchronization signal blocks (SSBs), a set of SSB timing groups in an SSB burst;
    generating, based on the set of SSB timing groups, a receiver switching pattern that indicates whether to switch a receiver of the UE to operate at one or more inter-frequency layers associated with a serving cell of the UE with respect to individual SSB timing groups of the set of SSB timing groups; and
    switching, based on the receiver switching pattern, the receiver to operate at individual inter-frequency layers of the one or more inter-frequency layers with respect to the individual SSB timing groups for respective SSB measurements in a radio resource control_connected (RRC_CONNECTED) state.

2. The non-transitory CRM of claim 1, wherein the determining the set of SSB timing groups further comprises:
    performing, upon reception of one or more SSB burst configurations, an SSB scanning measurement at the one or more inter-frequency layers with respect to one or more SSB bursts;
    selecting, based on the SSB scanning measurement, one or more SSBs that are to be measured at respective one or more inter-frequency layers for neighboring cell monitoring in the RRC_CONNECTED state; and determining one or more SSB timing groups based on the selected one or more SSBs and their corresponding timing information.

3. The non-transitory CRM of claim 2, wherein the selecting the one or more SSBs further comprises:

determining, based on the SSB scanning measurement, individual quality metrics of the one or more SSBs are greater than a scanning threshold.

4. The non-transitory CRM of claim 3, wherein the respective quality metrics are measurement results based at least on one of reference signal received power (RSRP), reference signal received quality (RSRQ), signal to noise and interference ratio (SINR), and received signal strength indicator (RSSI) measurement results in the SSB scanning measurement.

5. The non-transitory CRM of claim 3, wherein the respective SSB measurements are one or more SSB tracking measurements, and wherein the operations further comprise:

performing, based on the receiver switching pattern, the one or more SSB tracking measurements with respect to the individual inter-frequency layers of the one or more inter-frequency layers with respect to the individual SSB timing groups for the respective radio resource management (RRM) measurements in the RRC_CONNECTED state.

6. The non-transitory CRM of claim 5, wherein the set of SSB timing groups is a first set of SSB timing groups and the SSB scanning measurement is a first SSB scanning measurement at the one or more inter-frequency layers with respect to a first set of the one or more SSB bursts, and wherein the operations further comprise:

determining, based on performing the one or more SSB tracking measurements, that at least one quality metric of individual quality metrics of one or more measured SSBs is lower than a tracking threshold; and performing a second SSB scanning measurement at the one or more inter-frequency layers with respect to a second set of one or more SSB bursts.

7. The non-transitory CRM of claim 1, wherein the receiver switching pattern is to indicate whether to switch the receiver to operate at one inter-frequency layer of the one or more inter-frequency layers with respect to a respective SSB timing group of the set of SSB timing groups during one or more SSB bursts corresponding to respective measurement gaps.

8. The non-transitory CRM of claim 1, wherein the receiver switching pattern is to indicate to switch the receiver to operate at one inter-frequency layer of the one or more inter-frequency-layers with respect to one SSB timing group of the set of the SSB timing groups if the one SSB timing group includes only one selected SSB of the one or more selected SSBs.

9. The non-transitory CRM of claim 8, wherein the receiver switching pattern is to indicate to switch the receiver to operate at the one inter-frequency until the determination that the individual quality metrics of the one or more measured SSBs are lower than a tracking threshold.

10. The non-transitory CRM of claim 1, wherein the receiver switching pattern is to indicate to switch the receiver to operate at two or more inter-frequency layers with respect to one SSB timing group of the set of the SSB timing groups in a time-multiplexed fashion, if the one SSB timing group includes two or more selected SSBs of the two or more inter-frequency layers.

11. The non-transitory CRM of claim 1, wherein the receiver switching pattern is to indicate to switch the receiver to operate at an intra-frequency layer associated with the serving cell if no SSB timing group is to be measured.

12. The non-transitory CRM of claim 1, wherein the operations further comprise decoding, upon reception of the one or more SSB burst configurations, the one or more SSB burst configurations with respect to monitoring neighboring cell SSBs in the RRC_CONNECTED state.

13. A user equipment (UE), comprising:

interface circuitry configured to receive, upon reception of one or more synchronization signal block (SSB) burst configurations, a plurality of SSBs of a plurality of SSB bursts for an SSB scanning measurement, the plurality of SSB bursts being of a plurality of inter-frequency layers according to the one or more SSB burst configurations; and processing circuitry coupled with the interface circuitry, the processing circuitry configured to:

perform the SSB scanning measurement with respect to the received plurality of SSBs, determine, based on the SSB scanning measurement, a set of SSB timing groups for one or more incoming SSB bursts, generate, based on the set of SSB timing groups, a receiver switching pattern that indicates whether to switch a receiver of the UE to operate at the plurality of inter-frequency layers with respect to individual SSB timing groups of the set of SSB timing groups for the one or more incoming SSB bursts, and switch, based on the receiver switching pattern, the receiver to operate at individual inter-frequency layers of the plurality of inter-frequency layers with respect to the individual SSB timing groups for one or more SSB tracking measurements of the one or more incoming SSB bursts in a radio resource control_connected (RRC_CONNECTED) state.

14. The UE of claim 13, wherein the processing circuitry is further configured to determine the set of SSB timing groups by:

selecting, based on the SSB scanning measurement, one or more SSBs that are to be measured at the individual inter-frequency layers of the plurality of inter-frequency layers for neighboring cell monitoring in the RRC_CONNECTED state; and determining one or more SSB timing groups based on the selected one or more SSBs and their corresponding timing information.

15. The UE of claim 13, wherein the interface circuitry is further configured to perform, based on the receiver switching pattern, one or more SSB tracking measurements with respect to the individual SSB timing groups at the individual inter-frequency layers of the plurality of inter-frequency layers.

16. The UE of claim 15, wherein the processing circuitry is further configured to determine, based on the one or more SSB tracking measurements, that at least one quality metric of individual quality metrics of one or more SSBs that are measured one or more SSBs is lower than a tracking threshold.

17. The UE of claim 16, wherein the SSB scanning measurement is a first SSB scanning measurement and, the processing circuitry is further configured to determine to configure the interface circuitry to perform a second SSB scanning measurement in the one or more incoming SSB bursts.

\* \* \* \* \*